(12) United States Patent  
Le Saint et al.

(10) Patent No.: US 7,787,661 B2
(45) Date of Patent: Aug. 31, 2010

(54) METHOD, SYSTEM, PERSONAL SECURITY DEVICE AND COMPUTER PROGRAM PRODUCT FOR CRYPTOGRAPHICALLY SECURED BIOMETRIC AUTHENTICATION

(75) Inventors: Eric Fernand Le Saint, Fremont, CA (US); Dominique Louis Fedronic, Belmont, CA (US); John Jules Alexander Boyer, Ottawa (CA); Hong Liu, Singapore (SG)

(73) Assignee: ActivIdentity, Inc., Fremont, CA (US)

( * ) Notice: Subject to any disclaimer, the term of this patent is extended or adjusted under 35 U.S.C. 154(b) by 1152 days.

(21) Appl. No.: 11/391,473

(22) Filed: Mar. 29, 2006

(65) Prior Publication Data

US 2007/0195998 A1 Aug. 23, 2007

Related U.S. Application Data

(60) Provisional application No. 60/666,807, filed on Mar. 30, 2005.

(51) Int. Cl.
*G06K 9/00* (2006.01)
*G06F 21/00* (2006.01)
*G06F 7/04* (2006.01)
*H04L 9/32* (2006.01)

(52) U.S. Cl. .................. 382/115; 382/124; 340/5.52; 340/5.6; 713/186

(58) Field of Classification Search ............... 382/115, 382/124; 340/5.52, 5.53, 5.6; 713/185, 186; 235/380, 382

See application file for complete search history.

(56) References Cited

U.S. PATENT DOCUMENTS 5,594,227 A * 1/1997 Deo ........................... 235/380

6,799,275 B1 * 9/2004 Bjorn ........................ 713/186
6,973,565 B2 * 12/2005 Couillard .................... 713/100
2004/0034784 A1 * 2/2004 Fedronic et al. ............. 713/186
2005/0029343 A1 * 2/2005 Neymann .................... 235/380
2006/0226951 A1 * 10/2006 Aull et al. .................. 340/5.61

FOREIGN PATENT DOCUMENTS

| DE | 4442357 | 6/1996 |
| EP | 0864996 | 9/1998 |
| EP | 1237091 | 9/2002 |
| EP | 1387323 | 2/2004 |

OTHER PUBLICATIONS

International Search Report dated Jul. 11, 2006 with Written Opinion.

* cited by examiner

*Primary Examiner*—Jon Chang
(74) *Attorney, Agent, or Firm*—Muirhead and Saturnelli, LLC

(57) ABSTRACT

A system is used for authorizing access to a Personal Security Device. This system comprises a Personal Security Device 75 and another device 105 which is in functional communication with said Personal Security Device. Said Personal Security Device comprises identification information retrieval data and a biometric authentication application 200 which transfers said identification information retrieval data to said other device 105 in response to an identified match between biometric data sent by said other device and a predetermined biometric reference. Said other device 105 comprises a security executive application 230 for retrieving an Identification Information with at least said identification information retrieval data, thus generating a retrieved Identification Information, and transferring said retrieved Identification Information to said Personal Security Device 75. Said Personal Security Device comprises a security executive application 215 for authorizing access in response to an identified match between said transferred retrieved Identification Information and a predetermined Identification Information stored in said Personal Security Device.

22 Claims, 4 Drawing Sheets

METHOD, SYSTEM, PERSONAL SECURITY DEVICE AND COMPUTER PROGRAM PRODUCT FOR CRYPTOGRAPHICALLY SECURED BIOMETRIC AUTHENTICATION

RELATED APPLICATIONS

This application claims priority to U.S. Provisional App. No. 60/666,807, filed Mar. 30, 2005.

FIELD OF THE INVENTION

The present invention relates to a biometric authentication method which incorporates strong cryptography to ensure a security level with a false acceptance rate maintained at 1:1,000,000 compliant with FIPS 140 requirements (FIPS: Federal Information Processing Standards issued by the NIST, National Institute of Standards and Technology).

More specifically, the invention relates to a method for authorizing access to a Personal Security Device. It also relates to a system, a Personal Security Device and a computer program product for implementing such a method.

The term Personal Security Device (PSD) as described herein includes hardware based security devices such as cryptographic modules, smart cards, integrated circuit chip cards, portable data carriers (PDC), subscriber identification modules (SIM), wireless identification modules (WIM), USB token dongles, identification tokens, secure application modules (SAM), hardware security modules (HSM), secure multi-media tokens (SMMT), trusted platform computing alliance chips (TPCA) and like devices.

BACKGROUND OF THE INVENTION

Biometric authentication suffers from inadequate security when processed using a PSD such as a smart card. Due to the probabilistic nature of biometric authentication, the ability to obtain FIPS 140 certification is feasible but the quality settings that are necessary to enable the 10-6 FAR level of accuracy cannot be deployed. Unfortunately, the inability to utilize biometric authentication for a high level of accuracy increases administrative costs for password resets, etc. It would therefore be advantageous to provide a mechanism to implement fingerprint biometric authentication technologies in high-security environments.

BRIEF SUMMARY OF THE INVENTION

In order to improve security of biometric authentication when processed using a PSD, there is provided a method for authorizing access to a Personal Security Device, wherein said Personal Security Device is in functional communication with another device, comprising:
  said Personal Security Device transferring identification information retrieval data to said other device in response to an identified match between biometric data sent by said other device and a predetermined biometric reference,
  said other device transferring to said Personal Security Device an Identification Information retrieved thanks to at least said identification information retrieval data, and
  said Personal Security Device authorizing access in response to an identified match between said transferred retrieved Identification Information and a predetermined Identification Information stored in said Personal Security Device.

The term "biometric data" as described herein may refer to a biometric sample such as a raw biometric image captured from a biometric scanning device, or to a biometric template such as the output result of some set of image processing operations on a raw biometric sample, for example minutia extraction, core extraction, ridge flow metrics, etc.

Analogously, the term "biometric reference" as described herein may refer to a biometric sample such as a raw biometric image captured from a biometric scanning device, or to a biometric template such as the output result of some set of image processing operations on a raw biometric sample, for example minutia extraction, core extraction, ridge flow metrics, etc.

There is also provided a method for authorizing access to a Personal Security Device, wherein said Personal Security Device is in functional communication with another device connected to a biometric device, the method comprising:
  said biometric device recording biometric data,
  said other device transferring said biometric data to a biometric authentication application of said Personal Security Device,
  said biometric authentication application comparing said transferred biometric data with a predetermined biometric reference,
  said Personal Security Device transferring identification information retrieval data to said other device in response to an identified match between said biometric data and said predetermined biometric reference,
  said other device retrieving an Identification Information using at least said identification information retrieval data, thus generating a retrieved Identification Information, and transferring said retrieved Identification Information to a security executive application of said Personal Security Device,
  said security executive application comparing said transferred retrieved Identification Information with a predetermined Identification Information,
  said security executive application authorizing access to said Personal Security Device in response to an identified match between said transferred retrieved Identification Information and said predetermined Identification Information.

There is also provided a system for authorizing access to a Personal Security Device, comprising a Personal Security Device and another device which is in functional communication with said Personal Security Device, wherein:
  said Personal Security Device comprises identification information retrieval data and a biometric authentication application which transfers said identification information retrieval data to said other device in response to an identified match between biometric data sent by said other device and a predetermined biometric reference,
  said other device comprises a security executive application for retrieving an Identification Information with at least said identification information retrieval data, thus generating a retrieved Identification Information, and transferring said retrieved Identification Information to said Personal Security Device, and said Personal Security Device comprises a security executive application for authorizing access in response to an identified match between said transferred retrieved Identification Information and a predetermined Identification Information stored in said Personal Security Device.

There is also provided a Personal Security Device comprising:
- identification information retrieval data,
- a biometric authentication application which transfers said identification information retrieval data to another device which is in functional communication with said Personal Security Device, in response to an identified match between biometric data sent by said other device and a predetermined biometric reference,
- an input port for receiving from said other device an Identification Information retrieved by said other device with at least said identification information retrieval data, and
- a security executive application for authorizing access in response to an identified match between said transferred retrieved Identification Information and a predetermined Identification Information stored in said Personal Security Device.

There is also provided a computer program product for implementing a method for authorizing access to a Personal Security Device, wherein said Personal Security Device is in functional communication with another device, the computer program product comprising a computer readable medium carrying computer executable instructions that implement the method, wherein the method comprises:
- said Personal Security Device transferring identification information retrieval data to said other device in response to an identified match between biometric data sent by said other device and a predetermined biometric reference,
- said Personal Security Device receiving from said other device an Identification Information retrieved thanks to said identification information retrieval data, and
- said Personal Security Device authorizing access in response to an identified match between said transferred retrieved Identification Information and a predetermined Identification Information stored in said Personal Security Device.

Preferably, the Identification Information is a Personal Identification number (PIN) and/or the identification information retrieval data are decrypting data for decrypting said Identification Information transferred to said Personal Security Device.

The features and advantages of the invention will become apparent from the following detailed description when considered in conjunction with the accompanying drawings. Where possible, the same reference numerals and characters are used to denote like features, elements, components or portions of the invention. Optional components are generally shown in dashed lines.

DETAILED DESCRIPTION OF THE INVENTION

This invention addresses inherent limitations of biometric authentication and provides cryptographic security enhancements which greatly improve the security of a Personal Security Device, and especially of proprietary information stored within said Personal Security Device. Where necessary, applications used to implement the various embodiments of the invention are envisioned to be programmed in a high level language such as Java™, C++, and C, C # or Visual Basic™.

Figure 1:
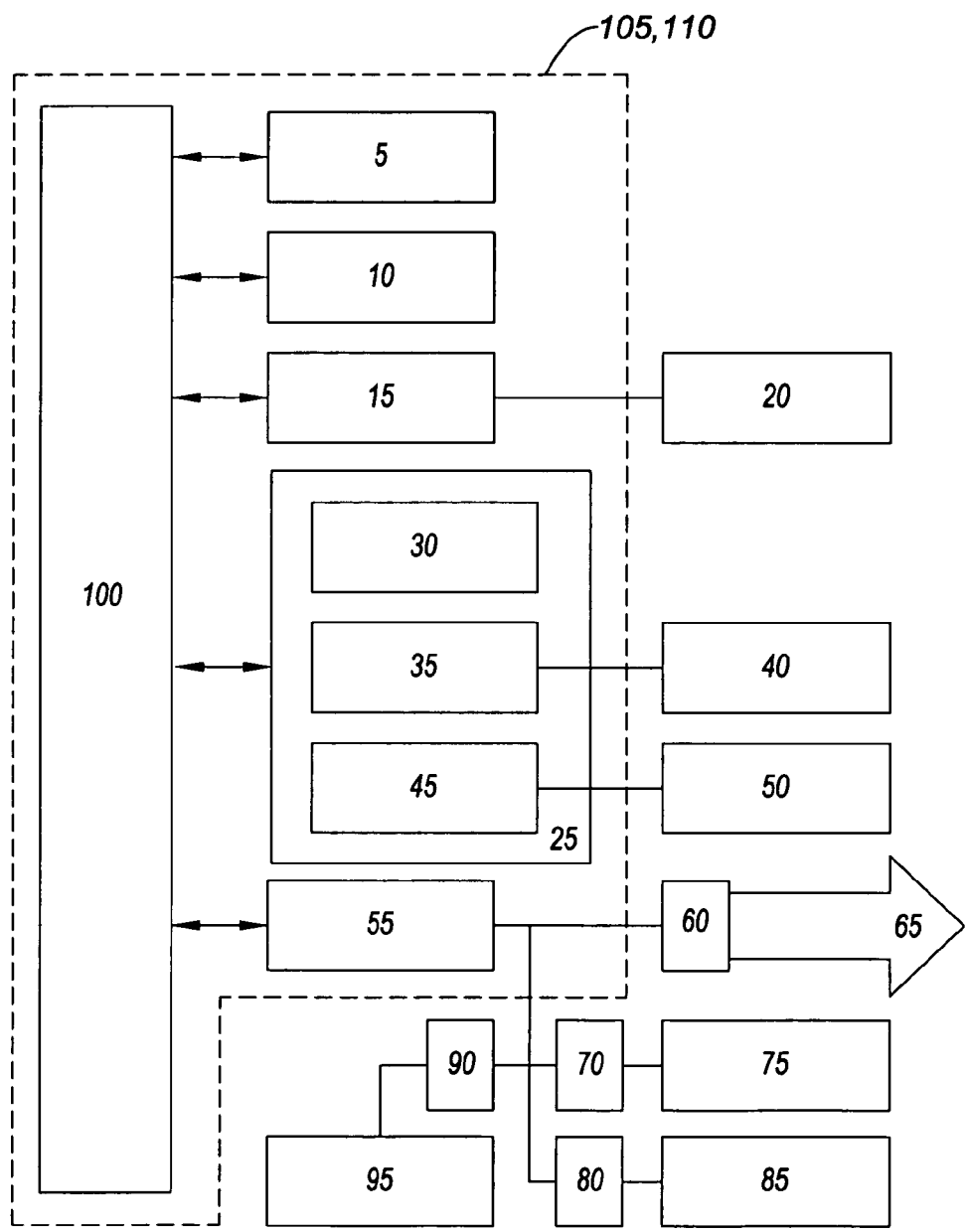
FIG. 1 is a schematic diagram illustrating a computer system and associated peripheral devices including a functionally connected smart card and a biometric scanner.

Referring to FIG. 1, a schematic diagram illustrating a computer system and associated peripherals is depicted. In a networking environment, the depicted computer system is intended to apply to both a terminal 105 and a server 110.

The computer system 105, 110 includes a processor 5, a main memory 10 and a display interface 15 that electrically couples a visual display device 20 to the computer system 105, 110. The visual display device 20 may include a touch sensitive screen.

The computer system 105, 110 further includes a secondary memory subsystem 25 which includes itself a hard disk drive 30, a removable storage drive 35 and an auxiliary removable storage interface 45. Said removable storage drive 35 is electrically coupled to a removable storage unit 40 and said auxiliary removable storage interface 45 is electrically coupled to a removable storage unit 50. The removable storage units 45, 50 are intended to include flash memory devices such as USB based solid state hard drives and related logical media drives.

The computer system 105, 110 further includes a communications interface 55 which is coupled to a network 65 via a network interface port 60. The network 65 includes traditional wired, optical or wireless networks which may incorporate a secure communications protocol such as Secure Socket Layer (SSL), Transport Layer Security (TLS), Private Communications Technology (PCT) or Internet Protocol Security (IPsec).

A Personal Security Device, for instance a smart card 75, is operably coupled to the communications interface 55.

The smart card 75 includes a wireless, optical and/or electrical connection means 70, including an input port, compatible with the communications interface 55, a microprocessor, a cryptography co-processor, volatile and non-volatile memory electrically coupled to the processor and co-processor, and a runtime operating environment. The smart card 75 includes the necessary cryptography extensions available to the runtime environment and is capable of performing symmetric and asymmetric cryptographic functions compatible with the computer system's and/or an authentication server's cryptography software.

The smart card 75 further includes at least one security executive application and at least one biometric authentication (Match-On-Card or MOC) application. Other security applications and security policies may be provided to allow implementation of various embodiments of the invention.

User input devices such as a mouse and a keyboard 85 are operatively coupled to the communications interface 55 via an appropriate interface port 80. Lastly, a biometric scanner 95 is likewise coupled to the communications interface 55 via an appropriate interface port 90. The biometric scanner 95 is used to capture biometric samples from one or more entities which become stored in a credential store.

The appropriate interface ports 60, 80, 90 and the connection means 70 include available PS/2, USB, parallel, Firewire, PCI, ISA and serial interface ports. Other proprietary interfaces with the communications interface 55 are likewise anticipated.

The processor 5, main memory 10, display interface 15, secondary memory subsystem 25 and communications interface 55 are electrically coupled to a communications infrastructure 100, commonly referred to as an I/O bus or system bus.

The computer system 105, 110 further includes an operating system, one or more security applications, a smart card application programming interface where necessary, one or more smart card aware applications, cryptography software capable of performing symmetric and asymmetric cryptographic functions compatible with that of the smart card 75 and/or an authentication server, and compatible biometric authentication applications, preferably supporting the various standards for interfacing biometric authentication applications to other security applications, such as, for example, BioAPI supported frameworks proposed by the BIOAPI Consortium (www.bioapi.org).

Figure 2:
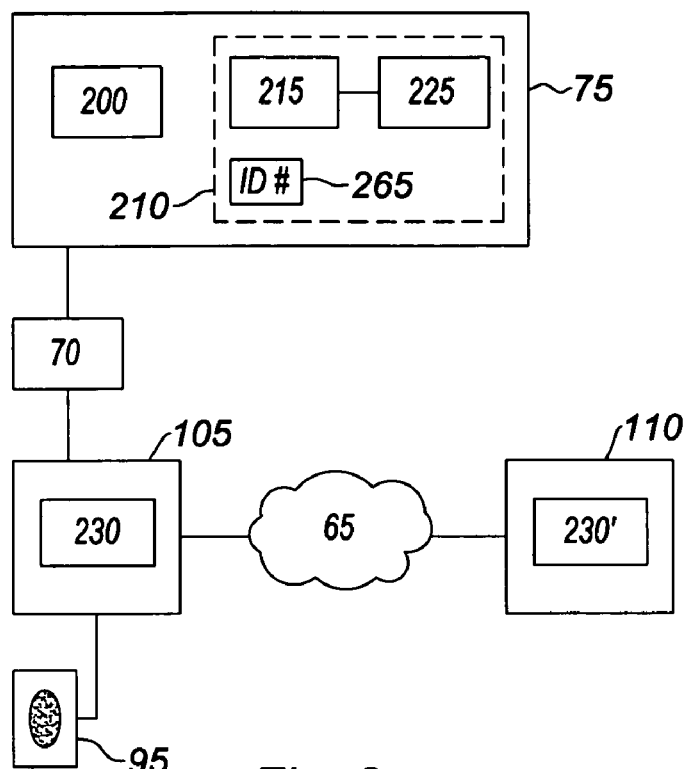
FIG. 2 is a schematic diagram illustrating an embodiment of a system according to the invention.

Referring to FIG. 2, a schematic diagram illustrating a system for implementing the invention is provided. This system comprises a smart card 75 which includes a biometric authentication application (MOC) 200, a card security executive application 215, and at least one secured object 225. The card security executive application 215, the secured object 225 and a card's unique identifier 265 are maintained within a security domain 210 controlled by the card security executive application 215. The secured object 225 may include security services, confidential information, electronic wallets and cryptographic key stores.

The system further comprises another device, for instance a terminal 105, as described in reference to FIG. 1, which includes at least one terminal security executive application 230 coupled to a biometric scanner 95, and a server 110, as described in reference to FIG. 1, which includes at least one server security executive application 230' which interfaces with the terminal security executive application 230 over a network 65.

Figure 3:
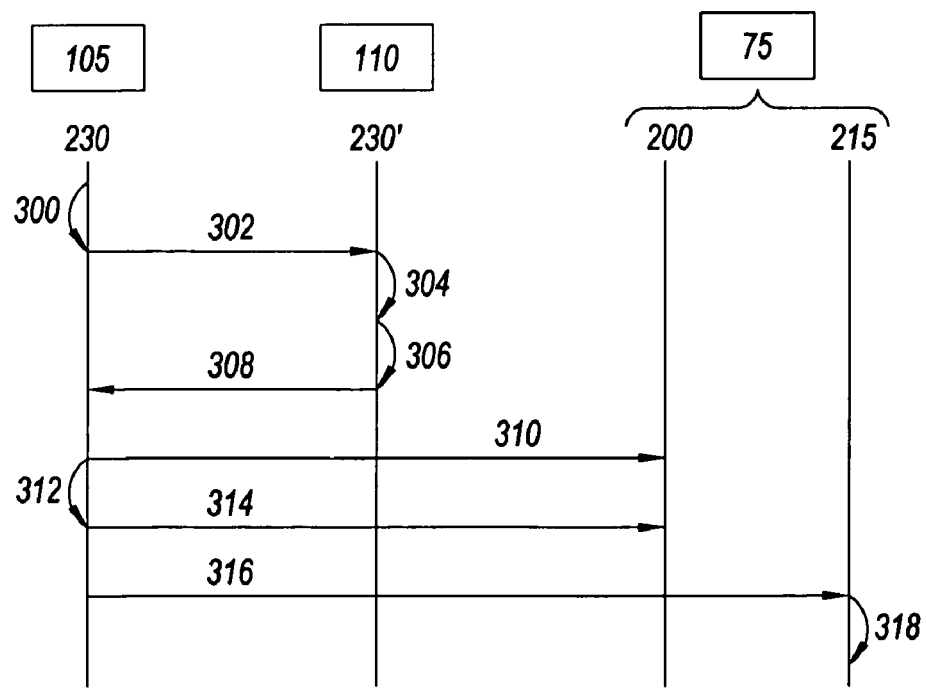
FIG. 3 is a flow diagram illustrating an initialization of the system of FIG. 2.

Referring to FIG. 3, successive steps of a method for initializing the system described in reference to FIG. 2 are illustrated.

In a first step 300, thanks to the biometric scanner 95, a user provides the terminal security executive application 230 with an initial biometric sample and an Identification Information such as a Personal Identification Number. The initial biometric sample is processed by the terminal security executive application 230, and sent over the network 65 to the server security executive application 230' during a step 302. In the following step 304, the initial biometric sample is cross referenced by the server security executive application 230' as a biometric reference using the card's unique identifier 265.

Then, in step 306, the server security executive application 230' causes a symmetric key SKC to be generated which is sent along (step 308) with the biometric reference over the network 65 using a secure channel (SSL or equivalent) to the terminal security executive application 230.

In step 310, the terminal security executive application 230 routes the received biometric reference to the card's biometric authentication application 200 for future use in matching with biometric data to be received.

In step 312, the received symmetric key SKC is used by the terminal security executive application 230 to encrypt a copy of the user's Personal Identification Number (PIN). According to a first embodiment of the invention (see FIG. 4), the resulting cryptogram $F(PIN)_{SKC}$ is maintained by the terminal security executive application 230. Alternatively, according to a second embodiment of the invention (see FIG. 6), the resulting cryptogram $F(PIN)_{SKC}$ can be sent by the terminal security executive application 230 to the server security executive application 230', where it is maintained.

The symmetric cryptographic key SKC is then sent to the card's biometric authentication application 200 where it is maintained, during a step 314.

The Personal Identification Number 220 is also sent by the terminal security executive application 230 to the card security executive application 215 where it is maintained, during a step 316.

Optionally, once the smart card 75 has received the symmetric key SKC, the biometric reference and the Personal Identification Number 220, the system initialization comprises a last step 318, wherein the Personal Identification Number is converted by the card security executive application 215 into a 20 bit binary form which is combined (not shown) with a binary random number of at least 108 bits to arrive at a total bit length of at least 128 bits. The combination of the Personal Identification Number and of the random number does not include information which would simplify a cryptographic attack. This combination is then encrypted with the symmetric key SKC using a cryptographically strong algorithm such as AES or 3DES. Likewise, the symmetric key SKC length should be at least 64 bits.

According to a preferred embodiment of the invention, the card's biometric authentication application 200 is programmed to release the symmetric cryptographic key SKC to the terminal security executive application 230 only upon a successful biometric authentication. According to a preferred embodiment of the invention too, the card security executive application 215 requires a match of the Personal Identification Number in order to allow access to the secured object 225.

Figure 4:
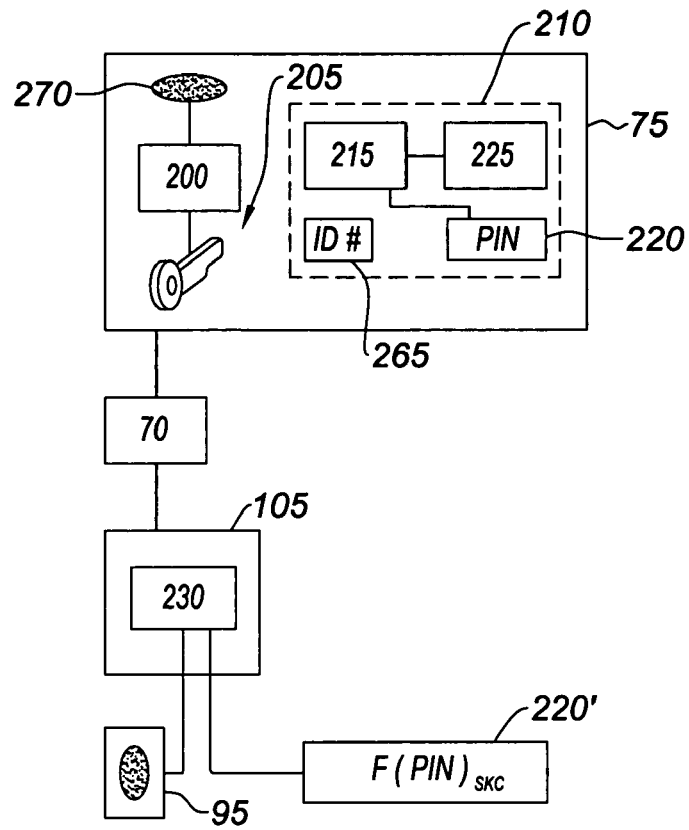
FIG. 4 is a schematic diagram illustrating partially the system of FIG. 2 once initialized, according to a first embodiment of the invention.

Referring to FIG. 4, the system of FIG. 2 is partially represented after initialization performed according to the first embodiment of the invention.

The biometric reference, represented by reference 270, and the symmetric key SKC, represented by reference 205, are maintained by the card's biometric authentication application 200. The Personal Identification Number, represented by reference 220, is maintained by the card security executive application 215. The resulting cryptogram $F(PIN)_{SKC}$, represented by reference 220', is maintained by the terminal security executive application 230. In another possible embodiment, the biometric reference 270 may be maintained by another device than the smart card 75.

Figure 5:
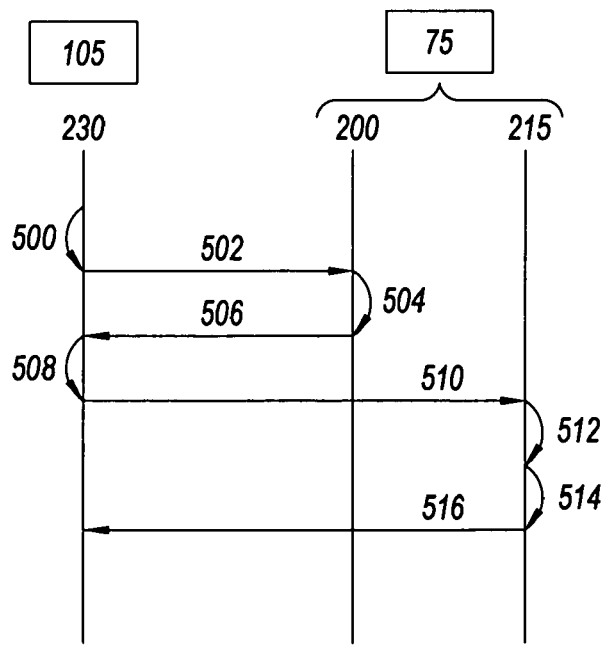
FIG. 5 is a flow diagram illustrating a method for authorizing access to secured objects, according to the first embodiment of the invention.

Referring to FIG. 5, a method for authorizing access to a PSD according to the first embodiment of the invention is depicted.

First, a user enters his or her biometric sample into the biometric scanner 95 of the terminal 105.

The terminal security executive application 230 processes the received biometric sample in step 500 and sends the processed biometric sample, i.e. biometric data, to the card's biometric authentication application 200 in step 502. Then, in step 504, the card's biometric authentication application 200 compares the received biometric data with the stored biometric reference 270. If a match is found, the symmetric key SKC 205 is released (step 506) to the terminal security executive application 230.

During this step 506 of releasing the symmetric key from the smart card to the terminal security executive application 230, the symmetric key should be protected for integrity and confidentiality and its origin should be identified. The state of the art is to use key agreement techniques such as protection against replay and "man-in-the-middle" between the smart card and the terminal prior to transmitting the symmetric key.

Then, in step 508, the terminal security executive application 230 uses the symmetric key SKC 205 to decrypt the cryptogram $F(PIN)_{SKC}$ 220'. The resulting decrypted binary string is converted by the terminal security executive application 230 into a plaintext string which is then sent (step 510) to the card security executive application 215 for comparison (step 512) with the stored Personal Identification Number 220. If a match is determined, access to the secured objects 225 is allowed in step 514 by the card security executive application 215.

In a last step 516, the terminal 115 is informed of this allowance.

Optionally, a second symmetric key may be retained by the terminal 115 and combined with the symmetric key SKC 205 to both encrypt the Personal Identification Number 220 and decrypt the resulting cryptogram $F(PIN)_{SKC}$ 220'. One skilled in the art will appreciate that a split or composite key arrangement operates analogously to the arrangement described herein. Therefore, the cryptographic key transferred by the smart card may not be the only secret necessary to decrypt the cryptogram $F(PIN)_{SKC}$ 220'.

Figure 6:
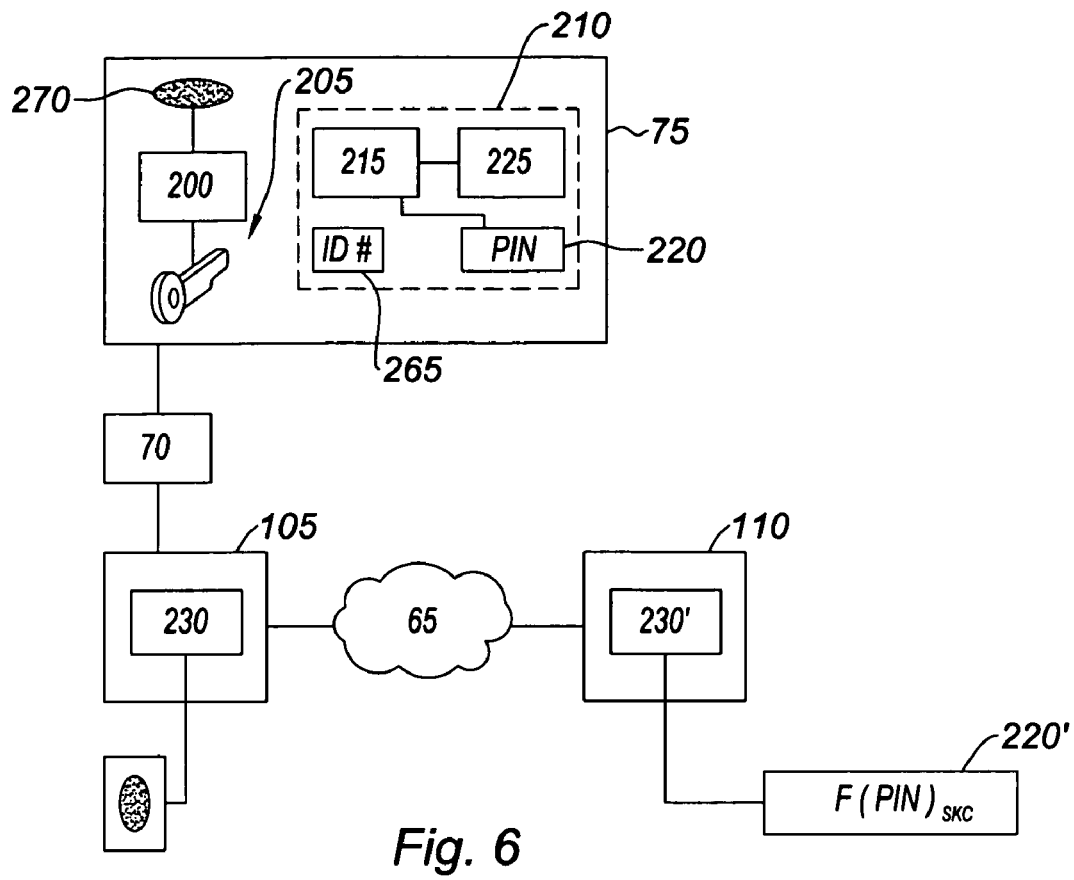
FIG. 6 is a schematic diagram illustrating the system of FIG. 2 once initialized, according to a second embodiment of the invention.

Referring to FIG. 6, the system of FIG. 2 is represented after initialization performed according to the second embodiment of the invention.

The biometric reference 270 and the symmetric key SKC 205 are maintained by the card's biometric authentication application 200. The Personal Identification Number 220 is maintained by the card security executive application 215. The resulting cryptogram $F(PIN)_{SKC}$ 220' is maintained by the server security executive application 230' and is retrievable from a data store based on the card's unique identifier 265. In another possible embodiment, the biometric reference 270 may be maintained by another device than the smart card 75.

Figure 7:
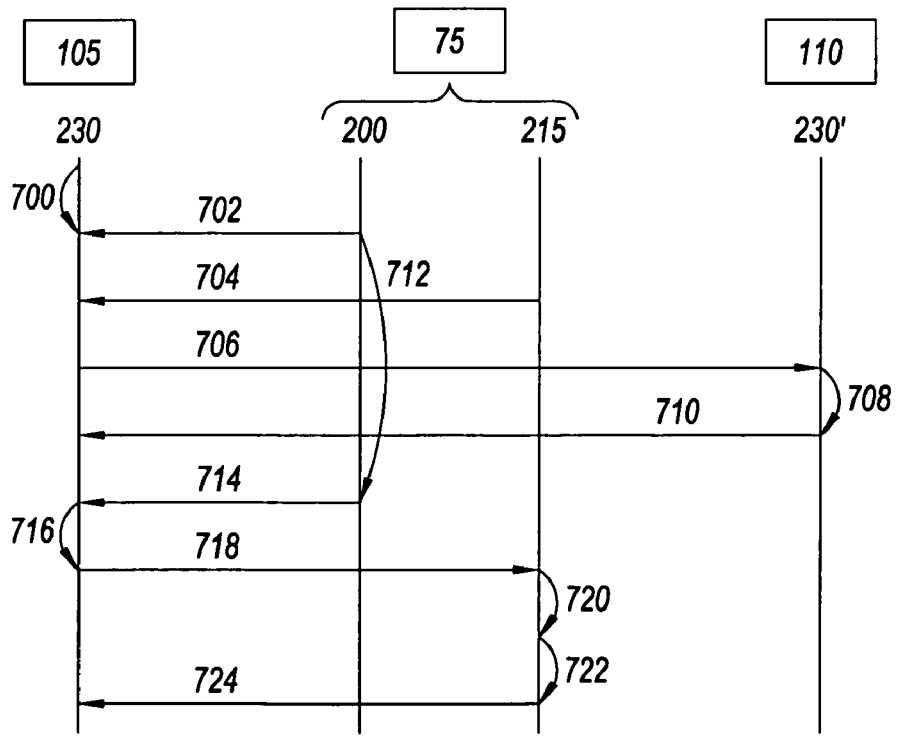
FIG. 7 is a flow diagram illustrating a method for authorizing access to secured objects, according to the second embodiment of the invention.

Referring to FIG. 7, a method for authorizing access to a PSD according to the second embodiment of the invention is depicted.

First, a user enters his or her biometric sample into the biometric scanner 95 of the terminal 105.

The terminal security executive application 230 processes the received biometric sample in step 700 and sends the processed sample, i.e. biometric data, to the card's biometric authentication application 200 in step 702.

In addition, the terminal security executive application 230 receives, in step 704, the card's unique identifier 265 from the smart card 75 and sends (step 706) a request over the network 65 to the server security executive application 230' to retrieve the cryptogram $F(PIN)_{SKC}$ 220' corresponding to the card's unique identifier 265. The server security executive application 230' retrieves said cryptogram $F(PIN)_{SKC}$ 220' from its data store in step 708 and sends it to the terminal security executive application 230 (step 710).

Steps 712, 714, 716, 718, 720, 722 and 724 illustrated in FIG. 7 are respectively identical to steps 504, 506, 508, 510, 512, 514 and 516 and will not be described again.

The foregoing described embodiments of the invention are provided as illustrations and descriptions. They are not intended to limit the invention to precise the form described. It is intended that changes and modifications can be made to the described embodiments without departing from the true scope and spirit of the invention as defined in the claims.

In particular, it is contemplated that functional implementation of the invention described herein may be implemented equivalently in hardware, software, firmware, and/or other available functional components or building blocks. No specific limitation is intended to a particular security system or arrangement.

It is also contemplated that a method or a system according to the invention may not be used only for accessing secured objects stored in a PSD. More generally, it may be used to simply activate the PSD and gain PSD holders privileges inside the PSD applications.

It is also contemplated that the terminal 105 may be replaced by an interface device relying on a server for process execution. More generally, the storage and decryption of the encrypted Personal Identification Number may be centralized to allow for roaming.

It is also contemplated that a method or a system according to the invention is not limited to the transfer of a cryptographic key from the PSD to the terminal 105 in response to a successful match. More generally, the PSD transfers identification information retrieval data, i.e. data necessary as input to a retrieval process, including but not limited to decryption, wherein the output of that retrieval process is a retrieved Identification Information such as a Personal Identification Number. Such identification information retrieval data may include for instance a card authenticator, including but not limited to the Personal Identification Number, or a signed authorization or privilege that can be validated or authenticated by the terminal to free a card access secret or key.

It is also contemplated that a method or a system according to the invention includes the following variants:

the cryptogram $F(PIN)_{SKC}$ 220' is encrypted with a secret key of the card's biometric authentication application 200, stored in the card's biometric authentication application 200, and released by the card's biometric authentication application 200 in response to a successful biometric authentication;

the cryptogram $F(PIN)_{SKC}$ 220' is encrypted with a secret key of the terminal 105, stored in the card's biometric authentication application 200, and released by the card's biometric authentication application 200 in response to a successful biometric authentication;

the cryptogram $F(PIN)_{SKC}$ 220' is encrypted with a secret key of the server 110, stored in the card's biometric authentication application 200, and released by the card's biometric authentication application 200 in response to a successful biometric authentication;

the cryptogram $F(PIN)_{SKC}$ 220' is encrypted on card with a secret key of the smart card 75, stored in the smart card 75 but outside the card's biometric authentication application 200, and the cryptogram secret is released by the card's biometric authentication application 200 in response to a successful biometric authentication;

the cryptogram $F(PIN)_{SKC}$ 220' is encrypted on card with a secret key of the smart card 75 and a secret key of the terminal 105, stored in the smart card 75 but outside the card's biometric authentication application 200, and the cryptogram secret is released by the card's biometric authentication application 200 in response to a successful biometric authentication;

the cryptogram $F(PIN)_{SKC}$ 220' is encrypted on card with a secret key of the smart card 75 and a secret key of the server 110, stored in the smart card 75 but outside the card's biometric authentication application 200, and the cryptogram secret is released by the card's biometric authentication application 200 in response to a successful biometric authentication;

the cryptogram $F(PIN)_{SKC}$ 220' is encrypted on personal computer with a secret key of the smart card 75, stored on personal computer, and the cryptogram secret is released by the card's biometric authentication application 200 in response to a successful biometric authentication;

the cryptogram $F(PIN)_{SKC}$ 220' is encrypted on personal computer with a secret key of the smart card 75 and a secret key of the terminal 105, stored on personal computer, and the cryptogram secret is released by the card's biometric authentication application 200 in response to a successful biometric authentication;

the cryptogram $F(PIN)_{SKC}$ 220' is encrypted on personal computer with a secret key of the smart card 75 and a secret key of the server 110, stored on personal computer, and the cryptogram secret is released by the card's biometric authentication application 200 in response to a successful biometric authentication;

the cryptogram $F(PIN)_{SKC}$ 220' is encrypted on server 110 with a secret key of the smart card 75, stored on server 110, and the cryptogram secret is released by the card's biometric authentication application 200 in response to a successful biometric authentication;

the cryptogram $F(PIN)_{SKC}$ 220' is stored on server 110, and a server authentication secret is released by the card's biometric authentication application 200 in response to a successful biometric authentication;

the cryptogram $F(PIN)_{SKC}$ 220' is stored on server 110, and a One Time Password authentication is allowed by the card's biometric authentication application 200 in response to a successful biometric authentication;

the cryptogram $F(PIN)_{SKC}$ 220' is stored on server 110, and a Public Key Infrastructure authentication is allowed by the card's biometric authentication application 200 in response to a successful biometric authentication;

the cryptogram $F(PIN)_{SKC}$ 220' is stored on server 110, and any other authentication (possibly multi-factor) is allowed by the card's biometric authentication application 200 in response to a successful biometric authentication.

The invention claimed is:

1. A method for authorizing access to a Personal Security Device, said Personal Security Device communicating with another device, the method comprising:
   transferring identification information retrieval data from said Personal Security Device to said other device in response to an identified match between biometric data sent by said other device and a predetermined biometric reference;
   transferring to said Personal Security Device from said other device an Identification Information retrieved using at least said identification information retrieval data; and
   authorizing access by said Personal Security Device in response to an identified match between said transferred retrieved Identification Information and a predetermined Identification Information stored in said Personal Security Device.

2. The method for authorizing access to a Personal Security Device according to claim 1, wherein said Identification Information is a Personal Identification Number (PIN).

3. The method for authorizing access to a Personal Security Device according to claim 1, wherein said identification information retrieval data are decrypting data for decrypting said Identification Information transferred to said Personal Security Device.

4. A method for authorizing access to a Personal Security Device, said Personal Security Device communicating with another device connected to a biometric device, the method comprising:
   recording biometric data at the biometric device;
   transferring said biometric data from said other device to a biometric authentication application of said Personal Security Device;
   comparing, via said biometric authentication application, said transferred biometric data with a predetermined biometric reference;
   transferring identification information retrieval data from said Personal Security Device to said other device in response to an identified match between said biometric data and said predetermined biometric reference;
   retrieving an Identification Information at said other device using at least said identification information retrieval data, thus generating a retrieved Identification Information, and transferring said retrieved Identification Information to a security executive application of said Personal Security Device;
   comparing, via said security executive application, said transferred retrieved Identification Information with a predetermined Identification Information; and
   authorizing access, via said security executive application, to said Personal Security Device in response to an identified match between said transferred retrieved Identification Information and said predetermined Identification Information.

5. The method for authorizing access to a Personal Security Device according to claim 4, wherein said retrieved Identification Information is a Personal Identification Number (PIN).

6. The method for authorizing access to a Personal Security Device according to claim 4, wherein said identification information retrieval data are decrypting data for decrypting said Identification Information transferred to said Personal Security Device.

7. The method for authorizing access to a Personal Security Device according to claim 2, further comprising an initialization of said Personal Security Device and said other device, said initialization including:
   recording, via said other device, initial biometric data and a Personal Identification Number entered by a user;
   sending, from said other device, to a server said initial biometric data;
   cross referencing, via said server, said initial biometric data as a biometric reference using a unique identifier of said Personal Security Device, and generating a cryptographic key;
   sending, by said server, said biometric reference and said cryptographic key to said other device;
   routing, by said other device, said biometric reference to said Personal Security Device where it is stored for future use in matching with biometric data to be received by said Personal Security Device;
   using said cryptographic key at said other device to encrypt a copy of said Personal Identification Number, thus generating a cryptogram; and
   sending, via said other device, said cryptographic key and said Personal Identification Number to said Personal Security Device where they are stored, said cryptographic key being stored as at least part of said identification information retrieval data.

8. The method for authorizing access to a Personal Security Device according to claim 7, wherein said cryptogram is stored in said other device.

9. The method for authorizing access to a Personal Security Device according to claim 7, wherein said other device sends said cryptogram to said server where it is stored in relation to said unique identifier of said Personal Security Device.

10. The method for authorizing access to a Personal Security Device according to claim 4, further comprising:
    transferring, via said Personal Security Device, a unique identifier to said other device;
    sending, from said other device, said unique identifier to a server;
    retrieving, at said server, a cryptogram related to said identifier; and
    sending, from said server, said cryptogram to said other device.

11. The method for authorizing access to a Personal Security Device according to claim 7, wherein once the Personal Security Device has received said cryptographic key and said Personal Identification Number, said Personal Identification Number is converted into a binary form which is combined with a binary random number, thus generating a combination which is then encrypted using said cryptographic key.

12. The method for authorizing access to a Personal Security Device according to claim 2, wherein a cryptographic key retained by said other device is used by said other device to be combined with said identification information retrieval data to obtain said retrieved Personal Identification Number.

13. The method for authorizing access to a Personal Security Device according to claim 1, wherein said identification information retrieval data is a symmetric cryptographic key.

14. A system for authorizing access to a Personal Security Device, comprising a Personal Security Device and another device which is in functional communication with said Personal Security Device, wherein:
    said Personal Security Device comprises identification information retrieval data and a biometric authentication application which transfers said identification information retrieval data to said other device in response to an identified match between biometric data sent by said other device and a predetermined biometric reference and
    said other device comprises a security executive application for retrieving an Identification Information with at least said identification information retrieval data, thus generating a retrieved Identification Information, and transferring said retrieved Identification Information to said Personal Security Device, and said Personal Security Device comprises a security executive application for authorizing access in response to an identified match between said transferred retrieved Identification Information and a predetermined Identification Information stored in said Personal Security Device.

15. The system for authorizing access to a Personal Security Device according to claim 14, wherein said Identification Information is a Personal Identification Number (PIN).

16. The system for authorizing access to a Personal Security Device according to claim 14, wherein said identification information retrieval data are decrypting data for decrypting said Identification Information transferred to said Personal Security Device.

17. A Personal Security Device, comprising:
    identification information retrieval data;
    a biometric authentication application which transfers said identification information retrieval data to another device which is in functional communication with said Personal Security Device, in response to an identified match between biometric data sent by said other device and a predetermined biometric reference;
    an input port for receiving from said other device an Identification Information retrieved by said other device with at least said identification information retrieval data; and
    a security executive application for authorizing access in response to an identified match between said transferred retrieved Identification Information and a predetermined Identification Information stored in said Personal Security Device.

18. The Personal Security Device according to claim 17, wherein said Identification Information is Personal Identification Number (PIN).

19. The Personal Security Device according to claim 17, wherein said identification information retrieval data are decrypting data for decrypting said Identification Information transferred to said Personal Security Device.

20. A computer program product for implementing a method for authorizing access to a Personal Security Device, wherein said Personal Security Device communicates with another device, the computer program product comprising a non-transitory computer readable medium carrying computer executable instructions that implement the method, wherein the method comprises:
    transferring identification information retrieval data to said other device in response to an identified match between biometric data sent by said other device and a predetermined biometric reference;
    receiving from said other device an Identification Information retrieved from using said identification information retrieval data; and
    said Personal Security Device authorizing access in response to an identified match between said transferred retrieved Identification Information and a predetermined Identification Information stored in said Personal Security Device.

21. The computer program product according to claim 20, wherein said Identification Information is a Personal Identification Number (PIN).

22. The computer program product according to claim 20, wherein said identification information retrieval data are decrypting data for decrypting said Identification Information transferred to said Personal Security Device.

* * * * *